United States Patent [19]

Meinzer

[11] Patent Number: 5,360,461
[45] Date of Patent: Nov. 1, 1994

[54] POLYMERIC STORAGE BED FOR HYDROGEN

[75] Inventor: Richard A. Meinzer, Glastonbury, Conn.

[73] Assignee: United Technologies Corporation, Hartford, Conn.

[21] Appl. No.: 110,469

[22] Filed: Aug. 23, 1993

[51] Int. Cl.$^5$ .......................... B01J 7/00; F02B 43/08
[52] U.S. Cl. .......................... 48/61; 123/3; 123/DIG. 12; 422/186; 422/199; 423/658.2
[58] Field of Search .................. 48/61, 190; 422/186, 422/186.3, 199, 164; 123/DIG. 12, 3; 206/0.7; 502/402; 252/188.25, 188.26; 423/248, 658.2, 647

[56] References Cited

U.S. PATENT DOCUMENTS

| | | | |
|---|---|---|---|
| 3,959,018 | 5/1976 | Dunlop et al. | 429/40 |
| 4,110,425 | 8/1978 | Bühl et al. | 423/648 R |
| 4,211,537 | 7/1980 | Teitel | 48/191 |
| 4,302,217 | 11/1981 | Teitel | 48/189.2 |
| 4,385,019 | 5/1983 | Bernstein et al. | 264/49 |
| 4,433,063 | 2/1984 | Bernstein et al. | 502/402 |
| 4,489,564 | 12/1984 | Häusler et al. | 62/46.2 |
| 4,589,919 | 5/1986 | Goodell et al. | 75/255 |
| 4,600,525 | 7/1986 | Baker et al. | 420/443 |
| 4,605,603 | 8/1986 | Kanda et al. | 429/59 |
| 4,681,582 | 7/1987 | Yamamoto | 604/890 |
| 4,687,650 | 8/1987 | Goodell et al. | 423/248 |
| 4,716,736 | 1/1988 | Schwarz | 62/46.2 |
| 4,723,595 | 2/1988 | Yasunaga et al. | 165/104.12 |
| 4,799,360 | 1/1989 | Retallick et al. | 62/46.1 |
| 4,810,463 | 3/1989 | Schwarz et al. | 419/10 |
| 4,960,450 | 10/1990 | Schwarz et al. | 62/18 |
| 5,057,300 | 10/1991 | Lilga et al. | 423/648.1 |
| 5,114,902 | 5/1992 | Schwarz et al. | 502/334 |
| 5,140,397 | 8/1992 | Haga et al. | 357/30 |
| 5,204,310 | 4/1993 | Tolles et al. | 502/416 |

OTHER PUBLICATIONS

"Hydrogen Use-Transportation Fuel", by H. Buchner, published in *Int. J. Hydrogen Energy*, vol. 9, No. 6, 1984, pp. 501–514.
"Hydrogen: An Alternative Fuel", by Daimler Benz.

*Primary Examiner*—Robert J. Warden
*Assistant Examiner*—Robert Carpenter
*Attorney, Agent, or Firm*—George J. Romanik

[57] ABSTRACT

A hydrogen storage device (2) includes a vessel (4) and a hydrogen storage bed (6) disposed in the vessel (4). The hydrogen storage bed (6) includes a polymeric material (8) having a plurality of micropores less than about 1 nm in diameter and at least one hydride forming metal (10) imbedded within the polymeric material (8). The device also includes means for optically and thermally decomposing the metal hydride to release hydrogen and means for conveying hydrogen into and out of the storage device (2). The hydrogen storage bed (6) may be made by distributing a hydride forming metal (10) within the polymeric material (8) while the polymeric material (8) is in an uncured state. A metal hydride may be formed in the presence of hydrogen at a pressure such that the hydrogen bonds to the hydride forming metal (10) to form a metal hydride within the polymeric material (8). The hydrogen pressure may be reduced such that the metal hydride dissociates and any dissolved hydrogen escapes through the polymeric material (8), thereby forming a plurality of micropores less than about 1 nm in diameter. The micropores may be molded into the polymeric material (8) by cooling the polymeric material (8).

14 Claims, 2 Drawing Sheets

POLYMERIC STORAGE BED FOR HYDROGEN

TECHNICAL FIELD

The present invention relates generally to a hydrogen storage device.

BACKGROUND ART

The use of hydrogen as a source of energy is becoming desirable as emissions from industry, traffic and homes continue to pollute the environment. Using hydrogen as an alternative fuel for many different systems is advantageous because hydrogen does not pollute the environment and because it has the highest energy density per unit weight of any chemical fuel. When used as fuel in combustion engines or fuel cells, hydrogen is oxidized to water. Unlike other fuels, burning hydrogen does not produce carbon dioxide, which has been tied to global warming. Hydrogen has potential as a fuel in both mobile environments, such as vehicles, and stationary environments, such as utilities. Due to the advantages of using hydrogen as fuel, there exists a need to achieve higher net energy storage densities than are presently possible. For example, in mobile applications a net energy density comparable to that of gasoline, 2960 watt-hour/kg assuming an energy efficiency of 23%, may be necessary for hydrogen to be an effective fuel substitute for gasoline. No alternative method or device for storing hydrogen currently exists to achieve this value.

Several methods of storing hydrogen exist. In one method, hydrogen is compressed and stored as a gas under pressures of about 20 MPa or more. Limitations of this method include undesirable system weight-to-volume storage ratios due to the heavy walled containers needed to store the gas at high pressure.

Similarly, liquefaction of hydrogen and storage at cryogenic temperatures possess limitations. For example, significant energy penalties exist because of the high energy required to liquify the hydrogen and to maintain it in the liquified state. Although another method, cryogenic storage of hydrogen in high surface area activated carbons, avoids the energy costs of liquefying the hydrogen, other limitations exist such as a low storage capacity per kilogram of storage medium.

Metal hydride storage is another option for hydrogen storage. In this system, a metal such as magnesium, vanadium, titanium or niobium reversibly forms a metal hydride by absorbing hydrogen in an exothermic reaction. Upon application of heat, the hydride disassociates into the metal and hydrogen, thus allowing the hydrogen to be used as fuel. Magnesium hydride is the preferred hydride because of its high weight percentage of hydrogen, 7.6%. Pure magnesium hydride, however, has poor hydriding and dehydriding kinetics. For example, it must be heated to about 300 C. to release hydrogen. This temperature cannot be readily achieved using waste heat from a combustion engine. Consequently, researchers have examined alternative magnesium compounds such as $Mg_2NiH_x$, $La_2Mg_{17}H_x$ and $Mg_2CuH_x$ as well as non-magnesium compounds such as $FeTiH_x$, $LaNi_5H_x$ and $CaNi_5H_x$. Although these alternatives have better hydriding and dehydriding kinetics, none of them contains a weight percentage of hydrogen that exceeds magnesium hydride.

The present metal hydrides also possess charge/discharge cycle limitations, which are a consequence of the hydride material decrepitating and compacting within its containment vessel after several charge/discharge cycles. Designing systems to compensate for compaction results in a loss of hydrogen storage per unit weight. Thus, the existing metal hydride systems are heavy and typical system energy storage densities are about 1/16th or less of that for gasoline. The maximum value for metal hydride storage, assuming 7.6 weight percent (wt. %) of hydrogen, is about 700 watt-hours/kg for an automotive engine efficiency of about 30%.

Physical storage of hydrogen using materials such as charcoal, zeolite or glass powder is another option. The resulting net energy densities in such systems, however, may also be insufficient for mobile applications. For example, the net energy density of hydrogen stored in charcoal at room temperature is only about 10 watt-hours/kg, which is substantially less than gasoline. Thus, the prior art currently has no practical way to enable hydrogen to be an effective fuel substitute for gasoline because the achievable net energy densities are not high enough.

Accordingly, there is a need for a hydrogen storage device capable of achieving higher net energy densities than are presently possible.

DISCLOSURE OF THE INVENTION

The present invention relates to a hydrogen storage device that may combine physical and chemical hydrogen storage mechanisms to achieve higher net energy densities than are presently possible. Additionally, the present invention may be able to achieve net energy densities which are comparable to gasoline.

One aspect of the invention includes a hydrogen storage device having a vessel and a hydrogen storage bed disposed in the vessel. The hydrogen storage bed includes a polymeric material having a plurality of micropores less than about 1 nm in diameter and at least one hydride forming metal imbedded within the polymeric material. The device also includes means for decomposing the metal hydride to release hydrogen and means for conveying hydrogen into and out of the storage device.

Another aspect of the invention includes a hydrogen storage device as discussed above, except the polymeric material includes a metal organic compound capable of forming a metal hydride.

Another aspect of the invention includes a method of making a hydrogen storage bed. A hydride forming metal is distributed in a polymeric material which is in an uncured state. A metal hydride may be formed in the presence of hydrogen at a pressure such that the hydrogen bonds to the hydride forming metal to form a metal hydride within the polymeric material. Alternatively, a metal hydride may be distributed directly into the polymeric material. Excess hydrogen at high pressure will dissolve into the polymeric material. The hydrogen pressure may be reduced such that the metal hydride dissociates and releases hydrogen that escapes through the polymeric material, forming a plurality of micropores less than about 1 nm in diameter. The micropores may be molded into the polymeric material by cooling the polymeric material.

Another aspect of the invention includes a method having similar steps as above except that a metal organic compound capable of forming a metal hydride is used instead of distributing a hydride forming metal in the polymeric material. In addition, the polymeric material is initially heated to decompose the metal organic compound.

The foregoing and other features and advantages of the present invention will become more apparent from the following description and accompanying drawings.

BEST MODE FOR CARRYING OUT THE INVENTION

Figure 1:
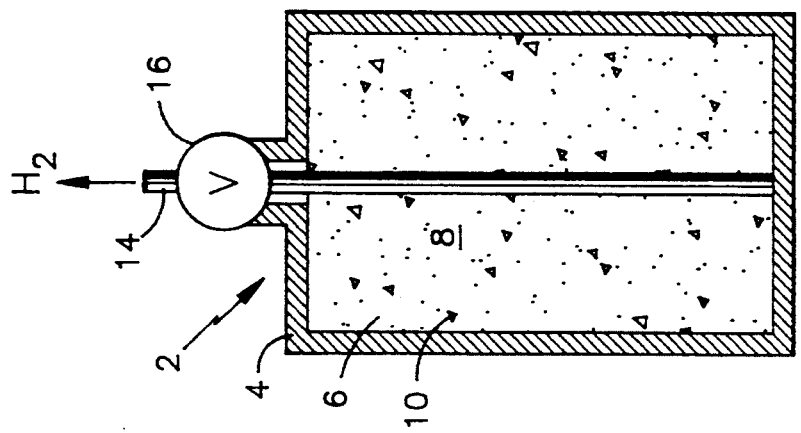
FIG. 1 is a schematic view of a hydrogen storage device of the present invention.

The hydrogen storage device 2 of FIG. 1 includes a vessel 4 and a polymeric hydrogen storage bed 6. In the various embodiments of the invention, the hydrogen storage bed 6 may rely on a combination of physical and chemical storage mechanisms to achieve high net energy densities. Either mechanism by itself may also achieve high net energy densities.

The vessel 4 of the present invention may be made of any material suitable to withstand the temperatures and pressures necessary for effective hydrogen storage. Preferably, the vessel 4 will be as light as possible, especially in mobile applications of the hydrogen storage device 2. Therefore, a vessel 4 made from a low density material may be desirable. Materials such as iron and steels are acceptable, but aluminum and composites are the preferred materials. The hydrogen storage bed 6 disposed in the vessel 4 includes a polymeric material 8 having a plurality of micropores less than about 1 nm in diameter. Preferably, the micropores are interconnected and are less than about 0.5 nm in diameter because it is advantageous to have a large number of small pores to store a significant amount of hydrogen in a small space. The polymeric material 8 may have a porosity of at least about 10%. Preferably, the porosity will be greater than about 50%. The micropores provide the physical hydrogen storage aspect of the invention and may store both molecular and atomic hydrogen.

At least one hydride forming metal 10 may be imbedded within the polymeric material 8 to chemically enhance hydrogen retention in the storage device 2 by reacting with the hydrogen. The metal 10 may comprise iron, titanium, magnesium, vanadium, niobium, nickel, copper, zinc, or another hydride forming metal. Various combinations of these materials may also be used for the metal 10. Magnesium is the preferred metal due to its ability to store hydrogen as magnesium hydride and to dissociate molecular hydrogen into atomic hydrogen. In addition, magnesium is much lighter than other metals, such as titanium, which are capable of dissociating hydrogen.

The polymeric material 8 may be any polymer capable of forming the micropores and withstanding hydrogen storage temperatures and pressures. It may either be a thermoplastic or thermosetting material and may be in the form of a thin sheet, a block, a plurality of concentric sheets, or a plurality of rods. The polymeric material 8 may be either a conducting or nonconducting material. Selection of the polymeric material 8 may determine the dominant hydrogen absorption mechanism. For example, if the polymeric material 8 is nonconductive, then chemical absorption may occur at metal atom sites within the polymeric material 8 and physical absorption may occur at the micropores. Both atomic and molecular absorption of hydrogen can occur. Metal atoms such as magnesium and titanium can cause hydrogen to dissociate so that atomic hydrogen can be absorbed by neighboring micropores within the polymeric material 8. If the polymeric material 8 is nonconductive, polymers such as polyesters, fluorocarbons and polyorganosiloxanes may be used. Fillers may then be mixed with the nonconducting polymeric material 8 to make it conducting. The fillers may be any metal capable of forming a metal hydride such as magnesium, vanadium, or titanium. Alternatively, the fillers may comprise a metal organic compound capable of decomposing at moderate temperatures of about 180° C. under hydrogen pressures of about 500 kPa. Metal organic compounds such as grignard reagents are acceptable, but conjugated heterocyclic compounds are preferred because they are planar. Alternatively, the polymeric material 8 may comprise a metal hydride.

If the polymeric material 8 is electrically conductive, then chemical absorption may occur in a manner similar to the bonding process in palladium. In this process, hydrogen dissociates into atoms with subsequent bonding of the atoms to conduction electrons. Physical absorption between the polymeric material 8 and hydrogen will provide the force for retaining hydrogen. Polymers such as polyaromatics, linear polyenes and charge-transfer salts may be used. Examples of polyaromatic conducting polymers include polyaniline, polypyrroles, polythiophenes, and polyphenylenes. The specific conductivity of these polymers is about $10^{-11}$ $(ohm-cm)^{-1}$, but doping can increase their conductivity. Examples of linear polyene polymers include polyacetylenes and polythiazyls. The specific conductivity of relatively pure polyacetylene is about $10^{-4}$ $(ohm-cm)^{-1}$, while that of metal doped polyacetylene is about $10^3$ $(ohm-cm)^{-1}$. Polythiazyls have specific conductivities comparable to doped polyacetylenes. Examples of charge-transfer salts include various derivatives of tetrathiafulvalene-tetracyano-p-quinodimethane (TTF-TCNQ). TTF is an electron donor and TCNQ is an electron acceptor. Other donors such as Bis (ethylenedithio)tetrathiafulvalene (BEDT-TTF (ET)) and acceptors such as tetracyanonaptho-2,6-quinodimethane (TNAP) may also be used. The specific conductivity of the charge transfer salts may be about $10^2$ $(ohm-cm)^{-1}$ at room temperature. The polyaromatics and charge transfer salts are preferred because they are capable of forming layered structures with void regions between each layer. Hydrogen molecules or atoms may be stored in these regions.

Preferably, the polymeric material 8 will be electrically conductive to enhance hydrogen release and promote hydrogen storage through the interaction of conduction electrons with the hydrogen.

Figure 2:
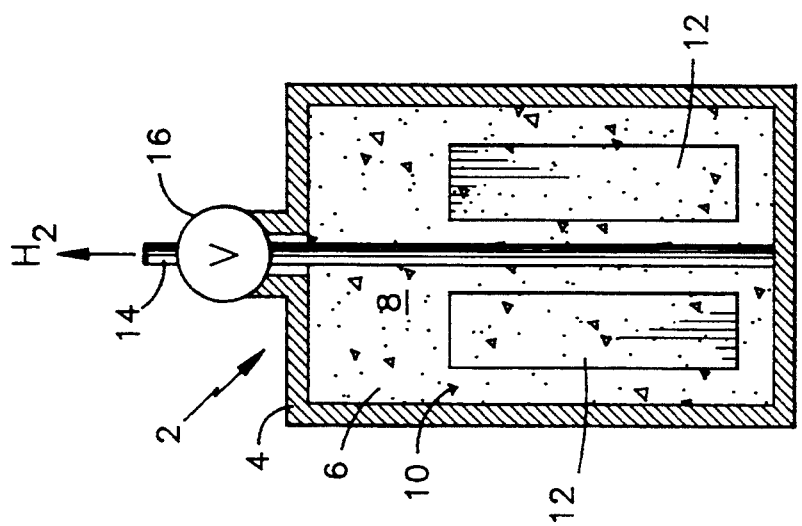
FIG. 2 is a schematic view of another hydrogen storage device of the present invention further including electrodes dispersed in a polymeric material.

The hydrogen storage device 2 also includes means for decomposing the metal hydride to release hydrogen. This could be accomplished by heating the storage bed 6 with hot exhaust from an engine or by circulating a heat transfer fluid through tubes in the polymeric material 8. Any other means known in the art may also be used. If the polymeric material 8 is electrically conductive, an electric current may be applied to a plurality of electrodes 12 to heat the polymeric material 8 by resistance heating, as shown in FIG. 2. This resistance heating could be used to initially provide hydrogen to start a combustion engine or to provide more uniform heating of the hydrogen bed 6 that may be simultaneously heated by another method.

Figure 3:
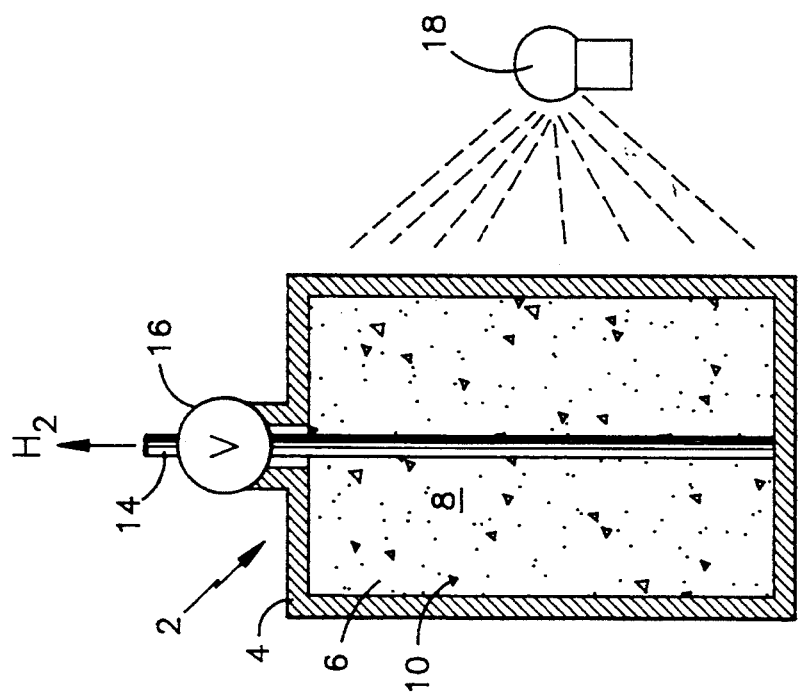
FIG. 3 is a schematic view of another hydrogen storage device of the present invention further including means for optically releasing hydrogen by direct fiber illumination.
Figure 6:
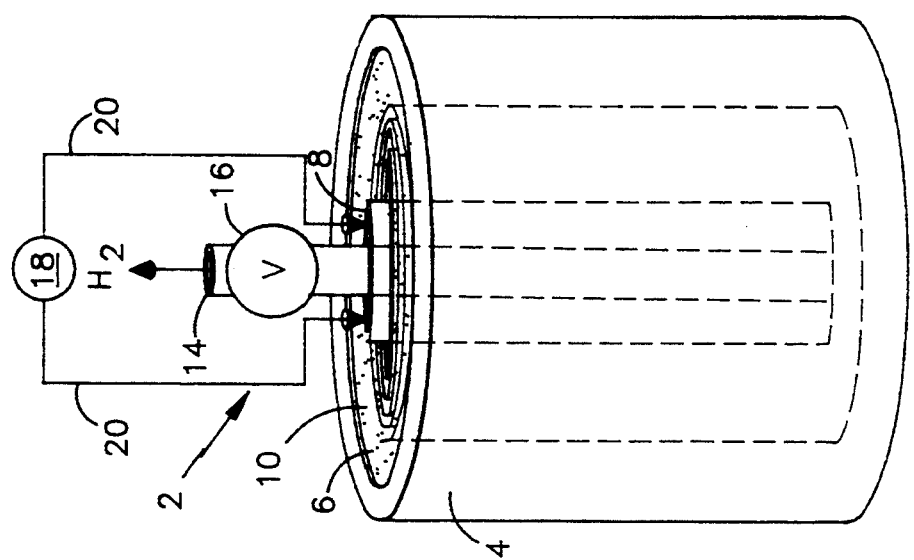
FIG. 6 is a schematic view of another hydrogen storage device of the present invention showing the polymeric material as a single sheet rolled in a spiral, wherein the polymeric material is used as a light pipe to release hydrogen.
Figure 5:
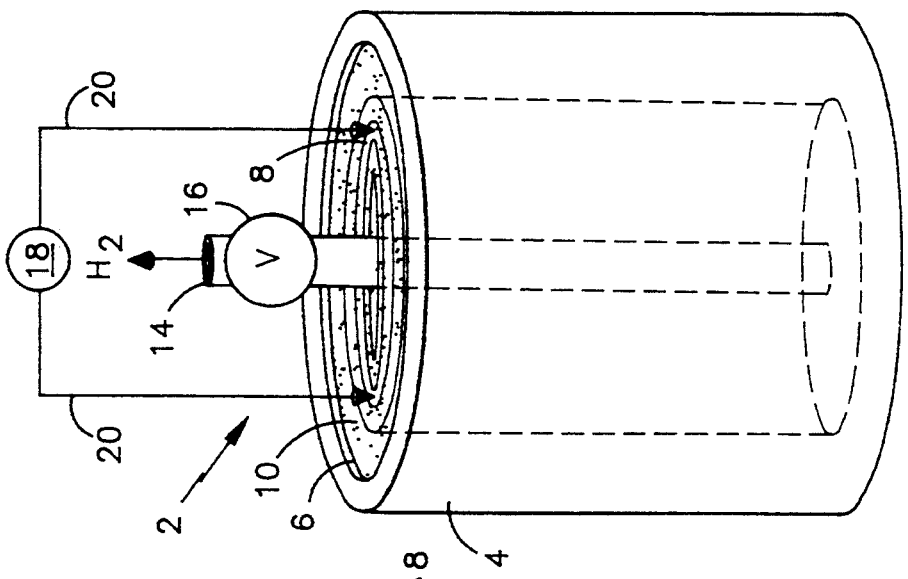
FIG. 5 is a schematic view of another hydrogen storage device of the present invention further illustrating a plurality of concentric sheets of polymeric material, wherein the polymeric material is used as a light pipe to release hydrogen.
Figure 4:
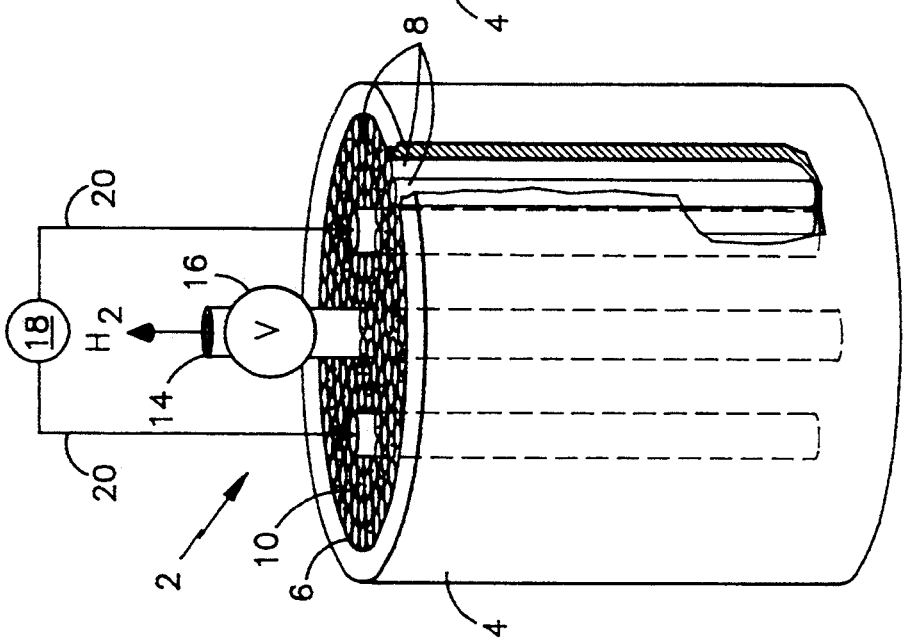
FIG. 4 is a schematic view of another hydrogen storage device of the present invention showing the polymeric material as a plurality of rods, wherein the polymeric material is used as a light pipe to release hydrogen.

Alternatively, the hydrogen may be released optically by transmitting photons which are capable of dissociating metal hydride bonds through the polymeric material 8. Light may be transmitted into the polymeric material 8 by any known means, such as direct illumination by a light source 18, as shown in FIG. 3. Light sources such as laser diodes or incandescent lamps may be used. Additionally, a window may be placed in the vessel 4 at a position such that illumination of the polymeric material 8 is enhanced by direct external light. Alternatively, a light source 18 may be placed inside the vessel 4. As shown in FIGS. 4–6, optical fibers 20 may also be used to transmit light into the polymeric material 8. In these embodiments, the polymeric material 8 acts as a light pipe and transmits light to reaction sites where hydrogen can be released. FIG. 4 shows the polymeric material 8 in the form of rods. Similarly, FIGS. 5 and 6 show the polymeric material 8 as a plurality of concentric sheets and as a single spiral sheet, respectively. The wavelength of the light used to illuminate the polymeric material 8 should be selected such that it breaks bonds between the hydrogen and hydride forming metal. For example, a wavelength of approximately 500 nm may be required to release hydrogen from magnesium hydride. The optical release of hydrogen may be combined with the previously described conventional method of heating the storage bed 6 to release hydrogen. Additionally, the device of the present invention includes means for conveying hydrogen into and out of the storage device 2. This may be accomplished by imbedding a perforated pipe 14 or similar device through the hydrogen storage bed 6. The pipe 14 may be equipped with a valve 16 or some other device for controlling the flow of hydrogen. Other conventional means of conveying hydrogen into and out of the device 2 are also acceptable.

Hydrogen storage material may be made as rods, blocks, sheets or pellets which are subsequently loaded into the storage device 2 to form the hydrogen storage bed 6. If the polymeric material 8 is nonconductive, the hydrogen storage bed may be made by distributing a hydride forming metal 10 within the polymeric material 8 which is in an uncured state. The metal 10 may be distributed in the polymeric material 8 by any appropriate method. For example, the metal 10, such as magnesium powder less than about 1 nm in diameter, may be placed on the polymeric material 8 which is then passed through hot rollers. As the magnesium covered polymeric material 8 passes between the hot rollers, the magnesium will be pressed into the polymeric material 8. Better distribution of the metal 10 within the polymeric material 8 can be achieved by heating the metal 10 so that metal vapor enters the polymeric material 8. Alternatively, a metal hydride may be imbedded in the polymeric material 8.

A hydride vapor or powder of a hydride forming metal, a metal organic vapor, or metal organic powder of a hydride forming metal, such as magnesium, magnesium vapor or metal organic vapor or metal organic powder could be added to a monomer before polymerization as another alternative. The monomer would then be heated to polymerize it and incorporate the hydride forming metal 10 or metal organic compound into the polymeric material 8.

If magnesium is present, the polymeric material 8 may be heated initially to provide the activation energy and initiate the hydride reaction. The polymeric material 8 may be heated from about 120° C. to about 250° C. in the presence of hydrogen at a pressure such that the hydrogen bonds to the hydride forming metal 10 to form a metal hydride within the polymeric material 8. A pressure greater than about 3450 kPa may be suitable. At room temperature other metal hydrides can form without the addition of heat due to the exothermic nature of the reaction.

The hydrogen pressure is reduced such that the metal hydride dissociates and releases hydrogen that escapes into the polymeric material 8. Hydrogen diffuses through the polymeric material 8 and forms a plurality of micropores less than about 1 nm in diameter in the polymeric material 8. The micropores may be molded into the polymeric material 8 by cooling the polymeric material 8 to about room temperature and sub-atmospheric pressure or some other suitable temperature and pressure.

Alternatively, if a polymeric material 8 comprising a metal organic compound capable of forming a metal hydride is used, the polymeric material 8 must be initially heated such that the metal organic compound decomposes to form a hydride forming metal 10.

If the polymeric material 8 is conductive, the hydrogen storage bed 6 may be made with a similar method as described above. Less metal 10, however, may be need to be added to the polymeric material 8 because conducting polymeric materials have a greater capacity to store hydrogen in void regions between the layers than do nonconducting polymers. Metal atoms may be mixed with the polymeric material 8 to provide sites for chemical reaction and sites at which the hydrogen molecules may dissociate into atoms. The atoms may diffuse from the metal sites into void regions within the polymeric material 8.

Hydrogen may be stored in the device 2 of the present invention by flowing hydrogen into the hydrogen storage bed 6 such that the hydrogen flows through micropores in the polymeric material 8. The hydrogen may react at a metal site to form atoms, which migrate away from the metal 10 and attach to the polymeric material 8 by a physioabsorption process. Hydrogen may be stored chemically in the form of a metal hydride and physically on the walls of the micropores.

Hydrogen is released by heating the hydrogen storage bed 6 to a temperature sufficient to decompose the metal hydride into hydrogen and the hydride forming metal 10. Alternatively, the hydrogen may be optically released by illuminating the metal hydride with photons of a wavelength selected to break bonds between the hydrogen and hydride forming metal 10.

The present invention overcomes some of the problems of the prior art. For example, the hydride forming metal 10 imbedded in the polymeric material 8 avoids the prior art problem of powdering metal hydrides. The hydrogen bonds to the hydride forming metal 10 to form a metal hydride within the polymeric material 8. Additionally, if the polymeric material 8 incorporates a metal organic compound capable of forming a metal hydride, the powdering problem of the prior art is essentially eliminated.

One advantage of optically releasing hydrogen is the immediate release of hydrogen. Since the entire hydrogen storage bed 6 does not need to be heated, less energy is required to obtain sufficient hydrogen to start a vehicle. The reduced energy requirement allows the use of a smaller battery in the vehicle. Once the vehicle starts, hot exhaust gases can supply the energy needed to release additional hydrogen. This fast response operating characteristic may be especially desirable for starting a vehicle in cold weather.

Advantages of physically storing hydrogen in micropores approximately 1 nm in diameter include an increase in the amount of hydrogen storage per unit surface area.

It should be understood that the invention is not limited to the particular embodiments shown and described herein, but that various changes and modifications may be made without departing from the spirit or scope of the claimed invention.

I claim:

1. A hydrogen storage device comprising:
   (a) a vessel,
   (b) a hydrogen storage bed disposed in the vessel, wherein the hydrogen storage bed comprises a polymeric material having a plurality of micropores less than about 1 nm in diameter,
   (c) at least one hydride forming metal imbedded within the polymeric material,
   (d) means for decomposing a metal hydride formed from the hydride forming metal to release hydrogen,
   (e) means for conveying hydrogen into and out of the vessel.

2. The device of claim 1, wherein the means for decomposing the metal hydride comprise means for heating the polymeric material.

3. The device of claim 1, wherein the means for decomposing the metal hydride comprise means for optically releasing hydrogen by transmitting photons through the polymeric material.

4. The device of claim 1 wherein the hydride forming metal comprises a material selected from the group consisting of iron, titanium, magnesium, vanadium, niobium, nickel, copper, zinc and mixtures thereof.

5. The device of claim 1 wherein the polymeric material is electrically conductive.

6. The device of claim 5 wherein the polymeric material is selected from the group consisting of polyaromatics, linear polyenes and charge-transfer salts.

7. The device of claim 5 further comprising electrodes disposed in the polymeric material.

8. A hydrogen storage device comprising:
   (a) a vessel,
   (b) a hydrogen storage bed disposed in the vessel, wherein the hydrogen storage bed comprises a polymeric material having a plurality of micropores less than about 1 nm in diameter and the polymeric material comprises a metal organic compound capable of forming a metal hydride,
   (c) means for decomposing the metal hydride to release hydrogen,
   (d) means for conveying hydrogen into and out of the vessel.

9. The device of claim 8, wherein the means for decomposing the metal hydride comprise means for heating the polymeric material.

10. The device of claim 8, wherein the means for decomposing the metal hydride comprise means for optically releasing hydrogen by transmitting photons through the polymeric material.

11. The device of claim 8 wherein the polymeric material comprises magnesium.

12. The device of claim 8 wherein the polymeric material is electrically conductive.

13. The device of claim 12 further comprising electrodes disposed in the polymeric material.

14. The device of claim 12 wherein the polymeric material is selected from the group consisting of polyaromatics, linear polyenes and charge-transfer salts.

* * * * *